Sept. 15, 1925
W. N. FRANK
FLUID GAUGE
Filed March 2, 1922
1,553,680
2 Sheets-Sheet 1
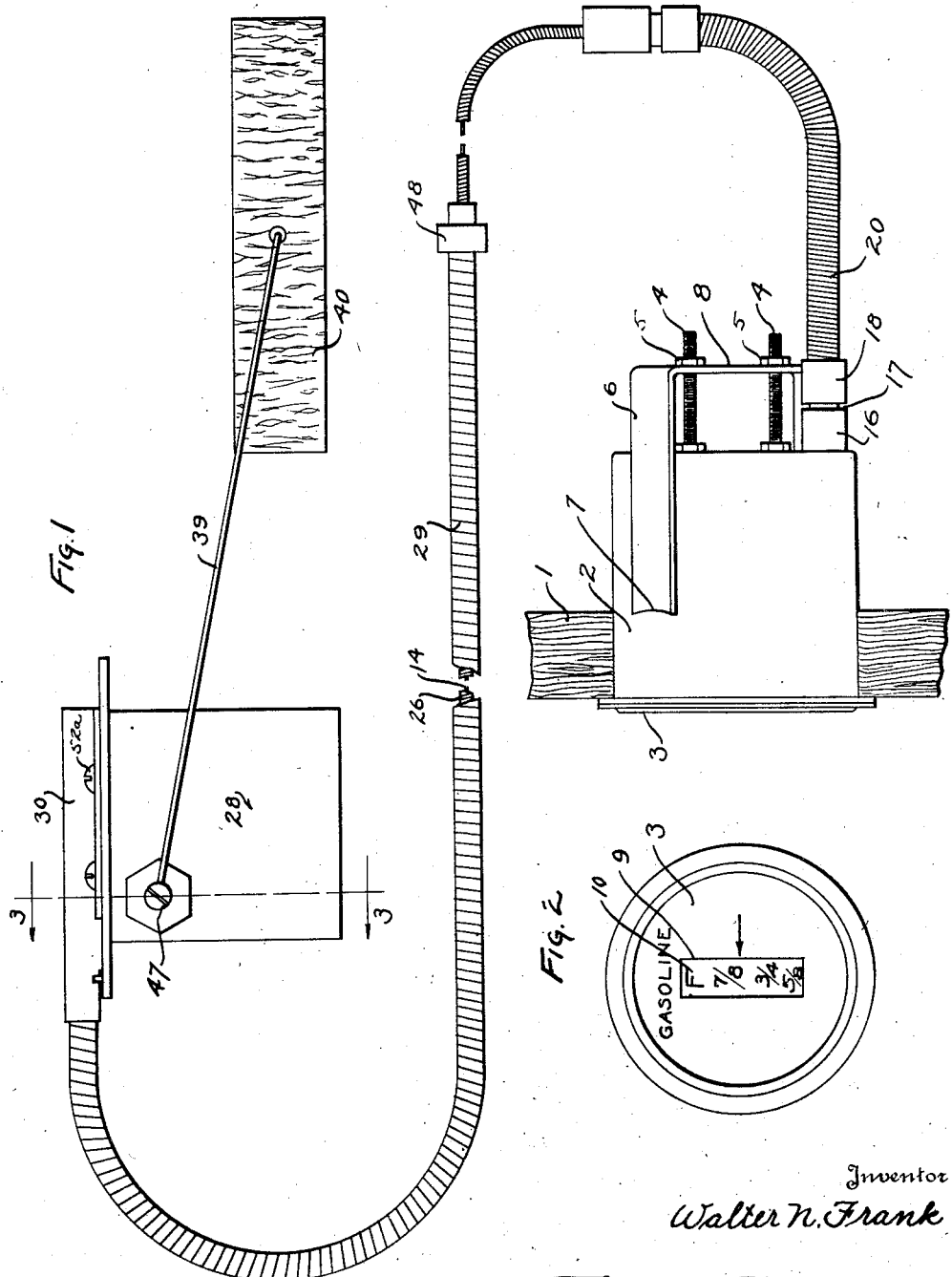
Inventor
Walter N. Frank
By Toulmin & Toulmin
Attorneys Sept. 15, 1925.  
W. N. FRANK  
FLUID GAUGE  
Filed March 2, 1922  
1,553,680  
2 Sheets-Sheet 2
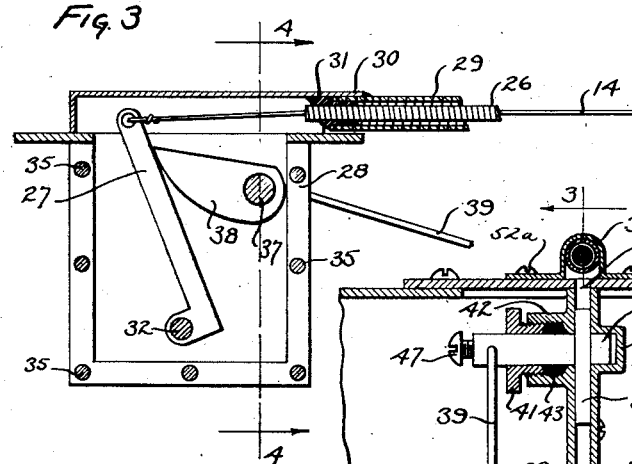
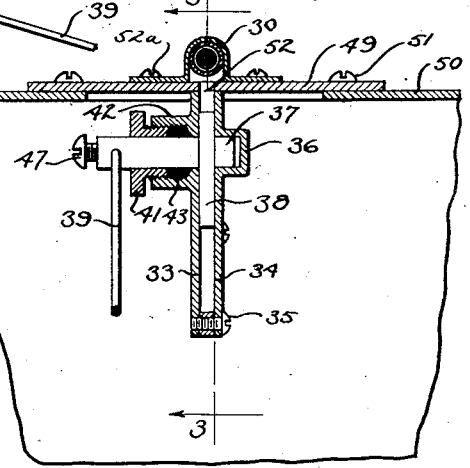
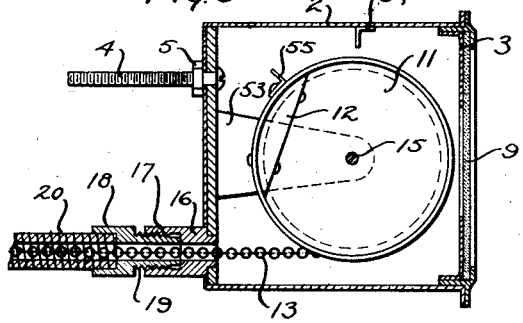
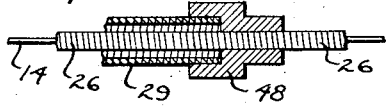
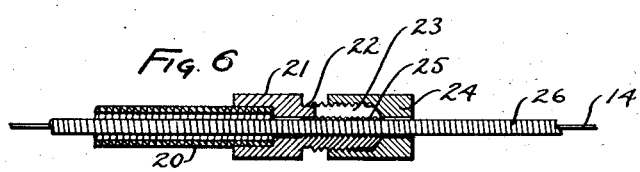
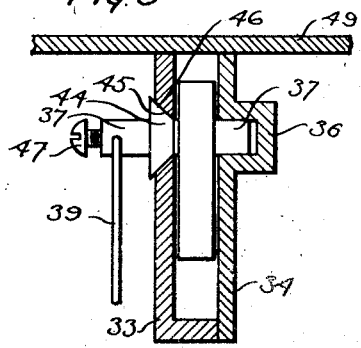
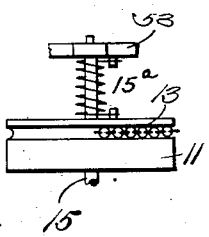
Inventor  
Walter N. Frank  
By Toulmin & Toulmin  
Attorney Patented Sept. 15, 1925.

1,553,680

UNITED STATES PATENT OFFICE.

WALTER N. FRANK, OF DAYTON, OHIO, ASSIGNOR, BY MESNE ASSIGNMENTS, TO THE GROLAN MANUFACTURING COMPANY, OF DAYTON, OHIO, A CORPORATION OF DELAWARE.

FLUID GAUGE.

Application filed March 2, 1922. Serial No. 540,529.

*To all whom it may concern:*

Be it known that I, WALTER N. FRANK, a citizen of the United States, residing at Dayton, in the county of Montgomery and State of Ohio, have invented certain new and useful Improvements in Fluid Gauges, of which the following is a specification, reference being had therein to the accompanying drawing.

My invention relates to fluid gauges and in particular to a fluid gauge adaptable to indicate the height of the fluids in tanks with the indicator at a position more or less remote therefrom.

It is an object of my invention to provide a tank gauge and in particular a tank gauge with a remote indicator or dial to indicate the quantity and height of the fluid in the tank.

It is my object to provide a gauge which may be adaptable to automotive equipment having pressure tanks or tanks connected to a vacuum feed or gravity tanks. It is my object to provide a gauge universally applicable to the three standard types of gauges used on automotive equipment whether for automobiles, trucks, tractors, airplanes, or the like.

It is my object to provide a gauge in which the pressure in the tank, if a pressure tank is employed, will tend constantly to maintain the several parts in sealed relationship to prevent the leakage of the pressure from the tank while at the same time the parts are arranged so as not to impede the ready movement of them to indicate the quantity or height of the fluid in the tank.

It is an additional object to provide a means of communication between the actuator in the tank and the indicator remote therefrom which will be adaptable to location in various positions and locations, will not be affected by heat or cold, will be moisture and dustproof, as well as oilproof, will not be affected by electrical currents, can be readily repaired and will be flexible so that it can be placed in locations that are relatively inaccessible or placed around the corners and the like.

It is a further object to provide a gauge in which this means of communication between the actuator and the indicator will be always maintained under a satisfactory tension without strain, will be maintained taut without slack, will accurately indicate the movement of the actuator upon the indicator and will be subjected to the least wear and damage to insure a long life.

It is my object to provide such a means which will be pulled by the indicator mechanism rather than pushed by the actuator mechanism. In my gauge it is an object to permit of the movement to be indicated due to a uniform pull on the communicating means. It is my object to provide such a gauge that the actuator permits the indicator to indicate rather than forces the indicator to indicate. This results in the elimination of the bending, twisting, or breaking of the communicating means due to its being pushed through its casing, due to the lack of support between the pushing means and the casing and to other causes, which would set up inherent defects in the pushing type of gauge.

It is a further object to provide a gauge that is readily adjustable in position, easily assembled and adaptable to various types of tanks so that one standard equipment will fit all tanks of all types and all quantities by simply calibrating the exposed face of the dial with the movement of the float to suit the varying sizes of tanks.

Referring to the drawings:

Fig. 1 indicates a complete assembly of the actuator, communicating means and indicator;

Fig. 2 is a front elevation of the dial face of the indicator;

Fig. 3 is a section of the actuator casing with one half of the casing removed to expose the lever and cam contained therein. This view is taken on the line 3—3 of Fig. 4.

Fig. 4 is a section on the line 4—4 of Fig. 3;

Fig. 5 is a section of the indicator casing with the drum in full lines and a section of the communicating means casing as attached to the indicator casing;

Fig. 6 is a section of the coupling means between the actuator casing and the communicating means casing;

Fig. 7 is a section of another portion of the housing for the actuating means;

Fig. 8 is an alternate construction of the sealing means between the interior of the tank and the actuator casing to prevent the escape of air pressure from the tank through the casing to the outside in case a pressure tank is used.

Fig. 9 is a detail view showing the indicator drum with a spring attached thereto.

Referring to the drawings in detail, 1 is a dashboard of an automobile in which is mounted the indicator casing 2 having an indicator face 3. The back of the casing contains a pair of bolts 4—4 upon which are the nuts 5. Between the nuts 5 and the dashboard 1 is a U-shaped clamp 6 which is adapted to have its inner end 7 engage with the inner surface of the dashboard 1 and its outer portion 8 engaged beneath the nuts 5. The bolts 4 pass through 8. It is thus possible by adjusting the position of the nuts 5 on the bolts 4 to vary the distance between the end 7 and the face of the indicator 3 to accommodate different thicknesses of dashboard on different makes of automobiles, airplanes, etc.

On the face of the indicator 3 is a cutaway portion 9 through which is exposed the scale 10 of the indicator drum 11. This scale contains the numerals or letters indicating the quantity or height of the fluid in the tank which is usually remote from the indicator. This drum 11 is eccentrically weighted as at 12. The purpose of this eccentric location of the weight is to keep the communicating means consisting of a chain 13 and a wire such as a piano wire 14 constantly taut to prevent bending, twisting or other injury to the wire thus shortening it and changing the registration of the drum and destroying the proper calibration of the instrument.

In the place of the weight there may be substituted a spring 15ª, as shown in Fig. 9, wound about the shaft 15 to maintain the drum constantly pulling against the chain 13 and the wire 14. This chain 13 passes through a sleeve 16 at the back of the indicator housing. This sleeve is internally threaded at 17 into which is threaded a member 18 having a threaded head 19. Connected to the interior of 18 is the flexible casing 20. A passage way is provided through 16, 17, 18 and 20 to permit the movement of the chain 13 freely. This connection of the threaded members is provided for the ready attachment of the several parts to one another in the complete assembly and much facilitates such an assembly in the manufacture of automobiles and similar equipment. This large tubular member of flexible character designated 20 travels for a short distance and terminates in the collar 21 attached thereto having a projection 22 of smaller diameter externally and internally threaded and slotted as at 23. These slots are of an appreciable width so as to permit of the compression of 22 by the threading thereon of the member 24 thus squeezing the internal thread 25 of 23 upon the casing 26. This casing is of smaller diameter than 20 and passes within an appreciable distance. Within 26 is the wire 14 that is joined at one end with 14 and at the other end to the lever 27 in the casing 28 of the actuator.

The casing 26 a substantial portion of its length is contained within another casing 29 of larger diameter which protects the inner casing. This casing 29 is forced into the upper portion of the actuator housing designated 30. Between 29 and 26 and 30 is forced a quantity of solder indicated at 31 to definitely position and locate the several casings. It will be understood that the wire 14 thus doubly protected may pass freely back and forth within 26 and be connected in any desired way with 27. 27 is pivoted in the casing 28 on a cross pin 32 mounted in the casing 28. The casing 28 is composed of a pair of spaced walls 33 and 34 which are bolted to one another by the bolts 35. This joint between 34 and 33 is airtight. A portion 36 is struck up in 34 to form a bearing for the member 37 which carries the cam of the actuator 38. 37 has on the exterior thereof the float arm 39 to which is attached the float 40. In Figure 4 a threaded clamping member 41 is threaded into a collar 42 on 33 and packing 43 is inserted to seal the joint to prevent the passage of air.

In Fig. 8 is another construction of somewhat similar but simpler character. On the member 37 is provided a conical member 44 having a ground tapering surface 45. This surface fits into a tapering aperture 46 in 33. The pressure is against this member 44 and serves to keep it constantly seated so that the greater the pressure the more thoroughly the joint is sealed.

The length of the arm 39 from 37 to the float 40 can be determined by the setting of the screw 47.

The casing 29 is connected to the casing 26 by a coupling 48 at the forward end. This coupling 48 firmly embraces 26 because it is crimped thereon at any desired location. 29 is permanently fastened within 48 but spaced from 26.

These casings 26, 20 and 29 are flexible spirally wound tubular members capable of taking considerable strain torsionally and longitudinally as well as laterally thus thoroughly protecting the fine piano wire which constitutes the actuating means between the actuator and the indicator.

Returning to the actuator, the casing members 34 and 33 are suspended from, or upon occasion may be integral with, a cover plate 49 which is fastened to the top of the tank 50 by the screws 51. There is an aperture or longitudinal cutaway portion at 52 in this plate to permit the movement of the lever 27. A tubular housing 30 is mounted upon 49 and retained thereon by the screws 52ª. This tubular housing provides the means of attachment of the casings to the actuator and also provides room for the upper end of 27 to travel in such a way that the wire 14 is bent to the slightest extent by 27 moving in an arc.

Method of operation.

As the fluid descends upon being consumed in the tank 50 the float 40 lowers carrying with it the arm 39 thereby actuating 37. As this occurs the cam 38 is lifted allowing the lever 27 against which it rests to move forwardly due to the pull exerted thereon by the wire 14 and the chain 13 which is connected to the drum. It will be recalled that the drum is pivotally supported on 15 carried in brackets 53 in the casing 2. The pull is due to the fact that the effect of gravity upon the weight 12 constantly puts 13 and 14 under tension as hereinbefore described. In order to limit the movement of 11 due to any pitching or plunging of the car, or for any other cause, a stop 54 is provided inside the casing 2 against which a stop 55 carried on the periphery of the drum 11 will rest in case the movement of 11 proceeds too far. These stops are so arranged that 12 can never get to a position to the right hand of 54 as Fig. 5 is viewed, and therefore 12 is always in a position to put 13 and 14 under tension and consequently maintain the lever 27 against the cam 38.

It will be observed, therefore, that this gauge is distinguished by the fact that this is not pushing of the wire, but the wire is constantly kept under tension and therefore there is no chance of it being buckled, warped or twisted due to being pushed.

While I have shown and described certain features as constituting my invention, it will be understood that parts have been shown for purposes of illustration only, and that I do not desire to be limited to such details, as obvious modifications will occur to a person skilled in the art.

Having thus fully described my invention, what I claim as new and desire to secure by Letters Patent, is:—

1. In combination, an indicator consisting of a drum moving bodily to indicate given quantities, an actuator, and connecting means therebetween directly connected to said drum at a predetermined point thereon, said connecting means consisting of a flexible member and means for maintaining said communicating means under tension between said indicator and actuator mounted on said drum, whereby perfect registration is obtained on the indicator.

2. In combination, an airproof actuator, a communicating means between said actuator and indicator consisting of a flexible member, an indicator, means for maintaining said communicating means taut between the actuator and indicator, means to protect the communicating means between the actuator and the indicator, and means to adjust the length of the communicating means and the protecting covering to vary the distance between the actuator and the indicator.

3. In combination, an actuator in a tank under pressure, said actuator consisting of a float and float arm exterior of said actuator, means on the interior thereof actuated thereby, means to prevent the escape of air through the actuator, a flexible connecting means connected to said actuated means in the actuator, a casing for said flexible means, an indicator connected to the flexible means, and a weight on said indicator adapted to constantly maintain the communicating means taut.

4. In combination, an actuator in a tank under pressure, said actuator consisting of a float and float arm exterior of said actuator, means on the interior thereof actuated thereby, means to prevent the escape of air through the actuator, a flexible connecting means connected to said actuated means in the actuator, a casing for said flexible means, an indicator connected to the flexible means, a weight on said indicator adapted to constantly maintain the communicating means taut, and means to limit the movement of the indicator and weight.

5. In combination, an actuator in a tank under pressure, said actuator consisting of a float and float arm exterior of said actuator, means on the interior thereof actuated thereby, means to prevent the escape of air through the actuator, a flexible connecting means connected to said actuated means in the actuator, a casing for said flexible means, an indicator connected to the flexible means, a weight on said indicator adapted to constantly maintain the communicating means taut, means to limit the movement of the indicator and weight, a second housing surrounding the first housing about the communicating means, a third housing connected to the indicator surrounding the first mentioned housing, means adapted on the end of each of the second and third housings to definitely fix them relative to the first mentioned housing.

6. In combination, an actuator consisting of an airtight casing, a supporting plate therefor, a detachable cap member, a float and float arm exterior thereof carried on a transverse shaft journaled therein, a transverse shaft and cam member thereon, said cam member being located within said casing, an airtight joint between said transverse shaft and the casing, and means engaging with said cam connected with an actuating means traveling in said casing.

7. In combination, an actuator consisting of an airtight casing, a supporting plate therefor, a detachable cap member, a float and float arm exterior thereof carried on a transverse shaft journaled therein, a transverse shaft and cam member thereon, said cam member being located within said casing, an airtight joint between said transverse shaft and the casing, means engaging with said cam connected with an actuating means traveling in said casing, an actuating means, an indicator dial connected thereto, a housing for said indicator, means on said indicator for maintaining said connecting means taut to maintain the cam engaging means against the cam.

8. In combination, an actuator consisting of an airtight casing, a supporting plate therefor, a detachable cap member, a float and float arm exterior thereof carried on a transverse shaft journaled therein, a transverse shaft and cam member thereon, said cam member being located within said casing, an airtight joint between said transverse shaft and the casing, means engaging with said cam connected with an actuating means traveling in said casing, an actuating means, an indicator dial connected thereto, a housing for said indicator, means on said indicator for maintaining said connecting means taut to maintain the cam engaging means against the cam, and a housing surrounding said communicating means to protect it.

9. In combination, an actuator consisting of an airtight casing, a supporting plate therefor, a detachable cap member, a float and float arm exterior thereof carried on a transverse shaft journaled therein, a transverse shaft and cam member thereon, said cam member being located within said casing, an airtight joint between said transverse shaft and the casing, means engaging with said cam connected with an actuating means traveling in said casing, an actuating means, an indicator dial connected thereto, a housing for said indicator, means on said indicator for maintaining said connecting means taut to maintain the cam engaging means against the cam, a housing surrounding said communicating means to protect it, and a second housing surrounding the first mentioned housing connected at one end to the actuator and the other end adapted to engage the first mentioned housing.

10. In combination, an actuator consisting of an airtight casing, a supporting plate therefor, a detachable cap member, a float and float arm exterior thereof carried on a transverse shaft journaled therein, a transverse shaft and cam member thereon, said cam member being located within said casing, an airtight joint between said transverse shaft and the casing, means engaging with said cam connected with an actuating means traveling in said casing, an actuating means, an indicator dial connected thereto, a housing for said indicator, means on said indicator for maintaining said connecting means taut to maintain the cam engaging means against the cam, a housing surrounding said communicating means to protect it, a second housing surrounding the first mentioned housing connected at one end to the actuator and the other end adapted to engage the first mentioned housing, a third housing having one end connected to the indicator casing and the other end adapted to embrace the first mentioned housing, and means to positively clamp said end to the first mentioned housing.

11. In combination, an actuator consisting of an airtight casing, a supporting plate therefor, a detachable cap member, a float and float arm exterior thereof carried on a transverse shaft journaled therein, a transverse shaft and cam member thereon, said cam member being located within said casing, an airtight joint between said transverse shaft and the casing, means engaging with said cam connected with an actuating means traveling in said casing, an actuating means, an indicator dial connected thereto, a housing for said indicator, means on said indicator for maintaining said connecting means taut to maintain the cam engaging means against the cam, a housing surrounding said communicating means to protect it, a second housing surrounding the first mentioned housing connected at one end to the actuator and the other end adapted to engage the first mentioned housing, a third housing having one end connected to the indicator casing and the other end adapted to embrace the first mentioned housing, means to positively clamp said end to the first mentioned housing, and a chain connected to the communicating means at one end traveling in the third housing and at its other end to the indicator dial, and means on the indicator dial to prevent the displacement of the chain.

12. In combination, and indicator dial, a housing therefor, means to actuate said indicator dial, a dial face on one end of said indicator housing cut away to expose a portion of the dial, an adjustable retaining means on the other end of said indicator housing adapted to embrace a supporting means for the indicator housing between the dial face and the retaining means.

13. In combination, an indicator dial, a housing therefor, means to actuate said indicator dial, a dial face on one end of said indicator housing cut away to expose a portion of the dial, an adjustable retaining means on the other end of said indicator housing adapted to embrace a supporting means for the indicator housing between the dial face and the retaining means, and means within the housing to constantly move the dial face to the zero position and to maintain the communicating means to an actuator constantly taut.

14. In combination, an indicator dial, a housing therefor, means to actuate said indicator dial, a dial face on one end of said indicator housing cut away to expose a portion of the dial, an adjustable retaining means on the other end of said indicator housing adapted to embrace a supporting means for the indicator housing between the dial face and the retaining means, means within the housing to constantly move the dial face to the zero position and to maintain the communicating means to an actuator constantly taut, and means on the indicator housing and on the dial to limit the movement of the indicator dial.

15. In combination, an actuator consisting of an airtight housing, a float arm and float on the exterior thereof adapted to actuate and an actuating means on the interior thereof, communicating means connected with the said actuating means, a casing for said communicating means sealed in said housing, an indicator, a dial pivoted therein adapted to display the face of the indicator dial through the face of the indicator housing and a weight eccentrically placed on said dial, said communicating means being attached to said dial, whereby the weight constantly tends to maintain the communicating means taut.

16. In combination, an actuator consisting of an airtight housing, a float arm and float on the exterior thereof adapted to actuate and an actuating means on the interior thereof, communicating means connected with the said actuating means, a casing for said communicating means sealed in said housing, an indicator, a dial pivoted therein adapted to display the face of the indicator dial through the face of the indicator housing and a yielding means connected to said dial, said communicating means being attached to said dial, whereby the weight constantly tends to maintain the communicating means taut.

17. In combination, a yielding flexible connecting means between an indicator and a drum actuator, comprising a single flexible member and a flexible spiral casing, the first mentioned member being adapted to pass freely within said casing and means mounted on the drum to maintain the flexible member taut.

18. In combination, a yielding flexible connecting means between an indicator and an actuator, comprising a single flexible member and a flexible spiral casing, the first mentioned member being adapted to pass freely within said casing, and a second spiral flexible casing surrounding the first mentioned casing and means mounted on the drum to maintain the flexible member taut.

19. In combination, a yielding flexible connecting means between an indicator and an actuator, comprising a single flexible member and a flexible spiral casing, the first mentioned member being adapted to pass freely within said casing, a second spiral flexible casing surrounding the first mentioned casing, and adapted to be clamped thereto and means mounted on the drum to maintain the flexible member taut.

20. In combination, a yielding flexible connecting means between an indicator and an actuator, comprising a single flexible member and a flexible spiral casing, the first mentioned member being adapted to pass freely within said casing, a second spiral flexible casing surrounding the first mentioned casing, said second casing being wound spirally in a direction opposite to the spiral winding of the first mentioned casing and means mounted on the drum to maintain the flexible member taut.

21. In combination, a flexible member adapted to pass freely in a spirally wound surrounding casing, a second spirally wound casing surrounding the first, a threaded head on said second casing fixed thereto, an internally threaded collar adapted to be threaded on said head, cutaway portions in said threaded head, internally threaded portions within said threaded head, whereby when the collar is threaded upon the threaded head it will be collapsed and squeezed upon the first mentioned casing and the internal threads on the threaded head will engage the spirals on the first mentioned casing.

22. In an actuator, a housing, a transverse member having a cone-shaped flange thereon adapted to fit in a cone-shaped bearing surface in said housing to form an airtight joint, the larger part of the cone on the transverse member being exposed to the pressure on the exterior of said casing, means on the other side of said casing for supporting said transverse member, means on the exterior end of said transverse member for supporting a float arm and means to adjust therein the position of said float arm.

23. In a gauge, an indicator, yielding means to constantly move the indicator in one direction, a flexible member connected to said indicator, and a float located in a tank remote from the indicator, said float being adapted to move in a vertical plane and actuate the flexible member in a substantially horizontal plane without bending said member, and means to maintain an air tight joint between the tank and the flexible member.

24. In a gauge combination, an indicator, a connecting means, means to move said indicator and connecting means in one direction, an actuator arranged to engage one end of the connecting means to move it in one direction, said actuator being adapted to move in the one direction independently of said connecting means.

25. In a gauge combination, an indicator, a connecting means, means to move said connecting means in one direction, an actuator adapted to engage with the other end of the connecting means, but not positively connected thereto, said actuator being adapted to move said connecting means in one direction against the resistance of the yielding means, and adapted to move freely in the other direction independently of the connecting means.

26. In a gauge combination, an indicator, a connecting means connected thereto at one of its ends, connecting means at its other end for permitting its movement to a limited degree, an actuator adapted to engage with said connecting means at its ends remote from the indicator, and yielding means to move said connecting means in one direction to resist the movement of said actuator in one direction and adapted to cause the connecting means to travel with the actuator in the other direction, the parts being so arranged that there is no fixed connection between the actuator and the directing means.

27. In a gauge combination, an indicator, a connecting means connected thereto at one of its ends, connecting means at its other end for permitting its movement to a limited degree, an actuator adapted to engage with said connecting means at its ends remote from the indicator, and yielding means to move said connecting means in one direction to resist the movement of said actuator in one direction and adapted to cause the connecting means to travel with the actuator in the other direction, the parts being so arranged that there is no fixed connection between the actuator and the directing means, and means for retaining said actuator and connecting means in an air-tight receptacle, said actuator being located in the receptacle for movement therein without the escape of pressure from the receptacle.

28. In a gauge combination, an indicator, a communicating means, means to move said indicator and communicating means in one direction, a float and float arm, a cam carried thereby, means connected to the other end of the communicating means adapted to be actuated by the cam to move the communicating means in the other direction with the indicator, said cam being adapted to move in one direction independently of said communicating means.

29. In a gauge combination, an indicator, yielding means for moving said indicator in one direction and to move a communicating means therewith, a communicating means, an actuator consisting of a float and float arm with a cam thereon, a lever pivoted adjacent the cam and adapted to be actuated thereby, the free end of the lever being connected to the communicating means, whereby the wire is always under tension moved in one direction by the yielding means and in the other direction by the float and float arm, and cam, said float arm and cam being adapted to move freely in one direction without disturbing the communicating means.

In testimony whereof, I affix my signature.

WALTER N. FRANK.